(12) United States Patent
Paramasivam et al.

(10) Patent No.: US 7,890,955 B2
(45) Date of Patent: Feb. 15, 2011

(54) POLICY BASED MESSAGE AGGREGATION FRAMEWORK

(75) Inventors: Kartik Paramasivam, Redmond, WA (US); Wei-Lun Lo, Issaquah, WA (US); Ruslan Yakushev, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 968 days.

(21) Appl. No.: 11/396,665

(22) Filed: Apr. 3, 2006

(65) Prior Publication Data

US 2007/0234369 A1 Oct. 4, 2007

(51) Int. Cl.
G06F 3/00 (2006.01)
G06F 9/44 (2006.01)
G06F 9/46 (2006.01)
G06F 13/00 (2006.01)

(52) U.S. Cl. .................................. 719/313
(58) Field of Classification Search ............... 719/313; 718/101
See application file for complete search history.

(56) References Cited

U.S. PATENT DOCUMENTS

| | | | | |
|---|---|---|---|---|
| 5,115,392 A | * | 5/1992 | Takamoto et al. | 718/101 |
| 5,361,353 A | * | 11/1994 | Carr et al. | 719/313 |
| 5,875,329 A | * | 2/1999 | Shan | 719/314 |
| 6,148,298 A | * | 11/2000 | LaStrange et al. | 707/5 |
| 6,697,960 B1 | * | 2/2004 | Clark et al. | 714/15 |
| 6,820,266 B1 | * | 11/2004 | Minakawa et al. | 719/313 |
| 6,886,046 B2 | | 4/2005 | Stutz et al. | |
| 7,155,483 B1 | * | 12/2006 | Friend et al. | 709/206 |
| 2001/0013069 A1 | | 8/2001 | Shah | |
| 2001/0031454 A1 | | 10/2001 | Mintz | |
| 2002/0049790 A1 | | 4/2002 | Ricker et al. | |
| 2004/0122902 A1 | | 6/2004 | Anderson | |
| 2004/0125747 A1 | | 7/2004 | Samadi et al. | |
| 2005/0033812 A1 | | 2/2005 | McCarthy et al. | |
| 2005/0152370 A1 | | 7/2005 | Meehan et al. | |
| 2005/0255833 A1 | | 11/2005 | Bar-Or | |
| 2005/0256965 A1 | | 11/2005 | Hohmann et al. | |
| 2005/0278731 A1 | | 12/2005 | Cameron et al. | |
| 2006/0209868 A1 | * | 9/2006 | Callaghan | 370/428 |

(Continued)

FOREIGN PATENT DOCUMENTS

WO WO 2005/119485 A1 12/2005

OTHER PUBLICATIONS

Khanna et al., "Control Message Aggregation in Group Communication Protocols," ICALP, 2002, pp. 135-146, Germany.

(Continued)

*Primary Examiner*—Andy Ho
*Assistant Examiner*—Timothy A Mudrick
(74) *Attorney, Agent, or Firm*—Senniger Powers LLP

(57) ABSTRACT

Messages generated by an originating application are aggregated into batches based on a configuration policy. The configuration policy contains business logic used to aggregate messages into a batch. Once a batch is complete, it is formatted into a single stream output and sent to a destination application designed to receive the messages. Messages may also be aggregated into batches that are controlled by the originating application. The messages include an indicator set by the originating application to signal when a batch is complete. Once the batch is complete, it is formatted into a single stream output and sent to a destination application designed to receive the messages.

17 Claims, 4 Drawing Sheets

U.S. PATENT DOCUMENTS

2007/0171919 A1* 7/2007 Godman et al. ............. 370/396

OTHER PUBLICATIONS

Hnatyshin et al., "Reducing Load Distribution Overhead with Message Aggregation," Proceedings of the 22nd IEEE International Performance Computing and Communications Conference, 2003, pp. 227-234, U.S.A.

Unknown, "BizTalk 101-Back to Basics," printed from http://geekswithblogs.com/asmith/articles/9778.aspx, printed on Jan. 17, 2006, 7 pages, U.S.A.

Written Opinion of the International Searching Authority in International Application No. PCT US2007/005765, dated Aug. 14, 2007, 7 pages.

* cited by examiner

POLICY BASED MESSAGE AGGREGATION FRAMEWORK

BACKGROUND

In today's global economy, companies often need to integrate applications, systems, and technologies from a variety of sources. Typically, these companies create systems for the computer-to-computer exchange of structured information, by agreed upon message standards, from one computer application to another by electronic means and with a minimum of human intervention. Examples of message standards include Health Level Seven (HL7) for health care related clinical and administrative data; GS 1 System for identification and communication of information regarding products, assets, services and locations; SWIFT for financial data; and EDI for the exchange of structured information by agreed message standards for the transfer of a variety of business transaction data.

As shown in FIG. 1, a business enterprise may communicate with a variety of partners in a variety of message formats. For example, the business may communicate with a customer in XML format; the business may communicate with a supplier application in EDI or Flat File message format; the business may communicate with a financial application in SWIFT message format; and the business may communicate with a logistics application in some other industry standard message format.

Unfortunately, the variety and number of messages complicates communication and creates inefficiencies in the typical business enterprise. Although solutions for aggregating messages may be written in custom software code, such solutions increase complexity and cost in an enterprise and are only suitable for particular circumstances.

SUMMARY

Aspects of the invention overcome one or more deficiencies in known computer-to-computer exchange of structured messages. An extensible, policy based message aggregation framework aggregates messages into batches, which permits multiple messages to be transmitted as a single output stream to a destination application.

In one aspect, the invention involves policy based message aggregation in which aggregation is based on a policy that contains business logic used to aggregate messages into a batch. In another aspect, the invention involves application based message aggregation in which the source application sets indicators in the messages that identify the messages to be batched and signal when the batch is complete.

Because the typical business enterprise generates many messages relating to critical business communications, message aggregation systems embodying aspects of the invention are reliable and extensible. Also, message aggregation may be implemented to decrease costs by accumulating messages and sending the messages when cost for the communication medium used to transmit the messages is lowest and increase performance by lowering the overhead involved with sending single messages by transmitting a bundle of messages at one time.

Computer-readable media having computer-executable instructions for message aggregation embody further aspects of the invention. Alternatively, embodiments of the invention may comprise various other methods and apparatuses.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
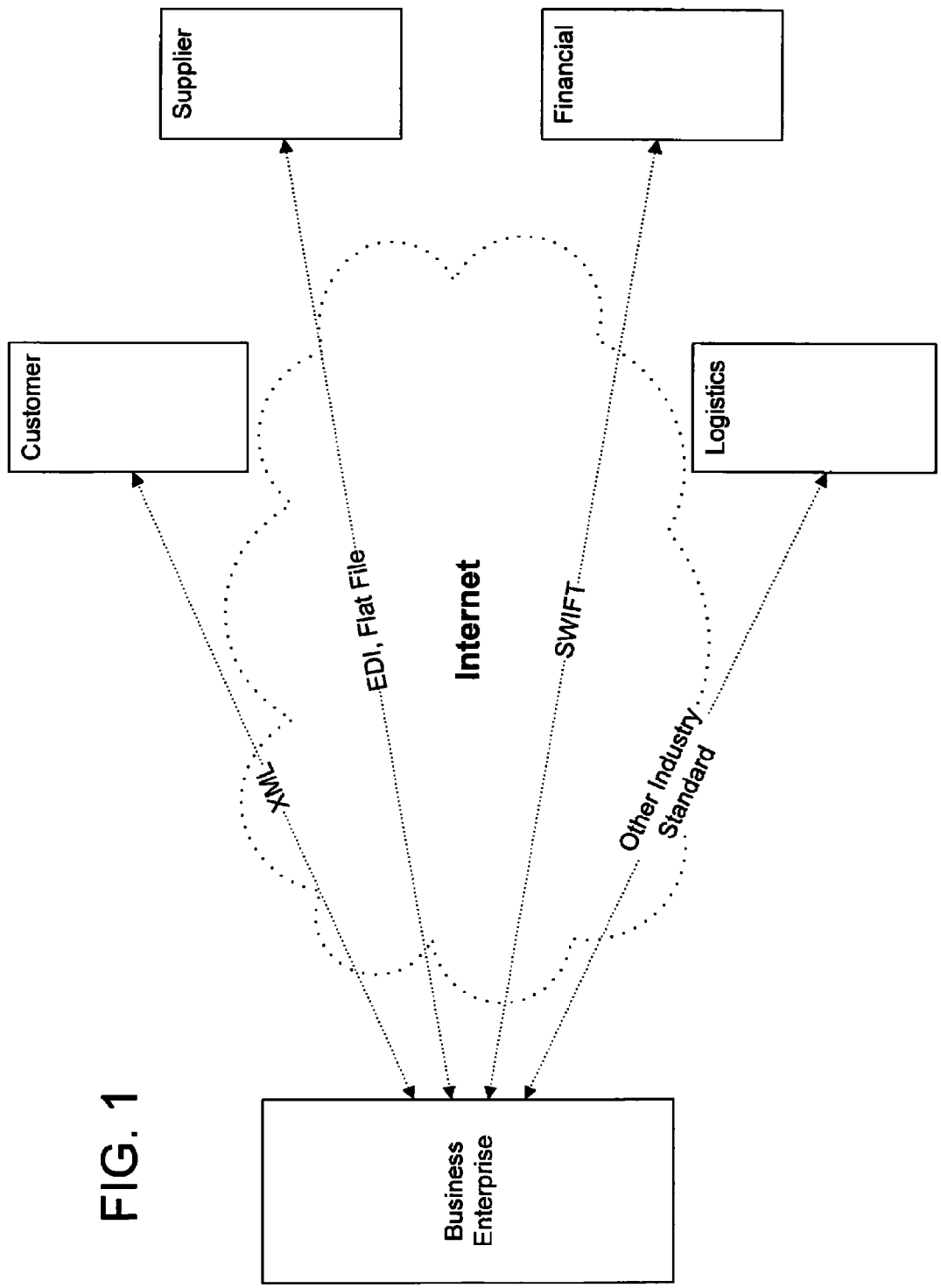
FIG. 1 is a flow diagram illustrating computer-to-computer exchange of structured messages according to the prior art.
Figure 2:
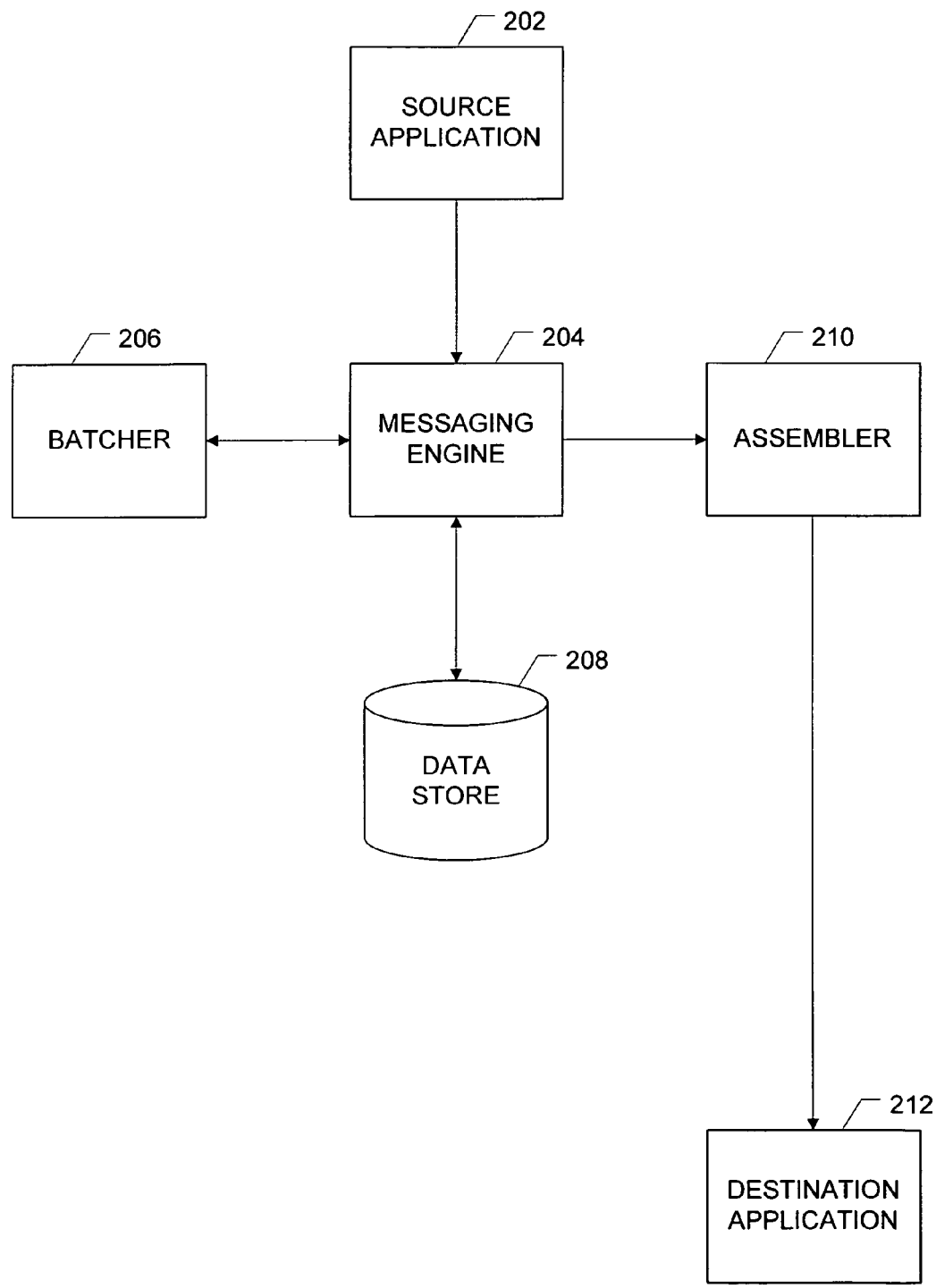
FIG. 2 is a block diagram illustrating a computing system environment for message aggregation according to an embodiment of the invention.

Referring further to the drawings, FIG. 2 illustrates one embodiment of a computing system environment for message aggregation. Message aggregation may be implemented to satisfy a number of business needs. For example, a business enterprise communicates with a variety of partners in a variety of message formats. Message aggregation allows increased performance at decreased costs while accommodating communication at specified times. In this example, the business enterprise may have a policy of ordering supplies from a supplier on a weekly basis. An application may allow the enterprise to order supplies throughout the week by generating messages addressed to a supplier. Embodiments of the invention permit aggregating these messages into a batch at the business enterprise for transmitting weekly to the supplier's application for fulfillment processing.

As another example, imagine that a business is receiving a large number of purchase orders from customers. To fulfill each customer purchase order, the business orders items from a partner company and the business communicates orders to the partner using EDI. But, the connection to the partner company is only available at a certain time of the day. Therefore, the business needs to accumulate all the orders for the partner and send them during the appropriate time of day. Additionally, businesses often have to pay for connection time to the partner. In this case, it is advantageous to bundle up all messages and open the connection once every couple of hours or so and transmit the single bundle of messages at one time. Moreover, aspects of the invention permit aggregation of messages in a variety of message formats, such as XML, EDI, Flat File, SWIFT, or some other industry standard message format.

As shown in FIG. 2, a source application 202 generates and sends messages. Those skilled in the art are familiar with sending messages addressed to a send port. A messaging engine 204 receives each message and one or more batchers 206 associated with the send port in the message address receive and aggregate the messages according to aspects of the invention. In one embodiment, the source application 202 and a destination application 212 communicate with the messaging engine 204 via endpoints. An endpoint is the logical representation of a location (e.g., expressed in URL form), providing a physical address for data received or sent. Endpoints in this embodiment are bi-directional and are used to pump messages into the messaging engine 204 as well as to get messages out of the messaging engine 204.

In another embodiment, the messaging engine 204 also writes the messages to a data store 208. If the messages in the batch are independent of one another, aspects of the invention may assemble the messages based on selected parameters defined by a business configuration policy. For example, the batch configuration policy contains business logic used to determine the number of messages in the batch, the cumulative number of bytes in the batch, the type of messages in the batch, and/or the time period for accumulating messages.

In one embodiment, batcher 206 is configured on the send port (e.g., BatcherType & BatcherLocation). For example, an adapter framework code base may be leveraged for this and implements an interface for storing the configuration and other send port configuration information. APPENDIX A illustrates an exemplary implementation of a messaging framework for outbound batching embodying aspects of the invention, including a batcher interface.

In another embodiment, the messaging engine 204 maintains an instance state 402 (see FIG. 4) for one or more the batchers 206. The instance state 402 includes a send port associated with the batcher 206 and a list of messages that have been addressed to the send port. The instance states 402 may be stored in the data store 208. The instance states are used to retrieve messages corresponding to each batcher instance in the event of system failure.

If the batcher 206 associated with a particular send port does not exist, the messaging engine 204 will create it. By creating each batcher 206 dynamically, batchers are created as needed, which promotes the extensibility of the message aggregation system. Additionally, dynamic creation of batchers 206 aides system performance by eliminating the overhead of idle batchers and permitting messaging engine 204 to manage an instance state 402 only for active batchers 206.

By storing the instance state 402 and the messages in data store 208, the batch may be recovered in case of system failure. In one embodiment, after restarting, messaging engine 204 can access the instance states 402 of the batches that were in progress at the time of failure. For each instance state 402, messaging engine 204 creates an instance of batcher 206. For each message in the message list of the instance state 402, messaging engine 204 resends the messages to batcher 206. Once the messages in the list have been resent to batcher 206, the batch will be in the same state as it was at the time of failure.

For example, the instance state 402 is a place to store the state of the application instance (in this case, Assembler/Batcher Instance). Although the messages corresponding to the application instance are stored in the data store, there is also a need to store information regarding the state of the application instance so that the application can retrieve the instance information to continue processing after a failure. Subscriptions are independent of instance state. The subscription table defines a list of services (identified by a Service ID) that receive messages satisfying a particular condition. When the message is published to the message box (e.g. data store 108), the message box evaluates the condition and identifies which service will receive that message. The message box then creates a logical instance of that service in an "Instances" table and dispatches the message to the messaging engine 204 after stamping the "InstanceID" on the message.

In another embodiment, the message includes a batcher identifier associated with the batcher 206. In this embodiment, a message box maintains a subscription table 408 defines the list of services (identified by a Service ID) that receive messages satisfying a particular condition. The message box receives messages from the source application 202. When the message is published to the message box, the message box evaluates the condition and determines which service will receive the message. The message box then creates the instance of the batcher 206 for the service if it does not exist. The message box then sends the message to the messaging engine 204. The messaging engine 204 hashes the batch identifier to determine the correct instance of the batcher 206. The messaging engine 204 then sends the message to determined batcher 206.

Once batcher 206 receives a message, it determines if a batch of messages is complete. In one embodiment, batcher 206 determines if the batch is complete as a function of a batch configuration policy. The batch configuration policy contains the business logic used to determine when the batch is complete. The business logic may include one or more of the following: a number of messages in the batch, a cumulative number of bytes in the batch, the type of messages in the batch, and a time period to accumulate messages. In another embodiment, the business logic may include a desired sort order for the messages in the batch, which allows batcher 206 to sort the messages within the batch.

The batcher 206 associated with the send port in the message address receives and aggregates the messages according to aspects of the invention. As described above, the messages in the batch may be independent of one another. In another embodiment, the messages in the batch are dependent on each other and the code that is producing the messages has knowledge of when a new batch is to be started and when that batch should be completed. In this embodiment, the message includes a batch end indicator. The batcher 206 will complete the batch if the batch end indicator signals that the batch is complete.

After the batcher 206 has determined that the batch is complete, it returns the batch to messaging engine 204. The messaging engine 204 sends the batch to an assembler 210. In turn, the assembler 210 serializes all the messages in the batch into a single output stream. In an alternative embodiment, the batcher 206 itself serializes all the batched messages into a single output stream. The assembler 210 sends the message stream to an destination application 212 associated with an application that is designed to receive the messages.

Figure 3:
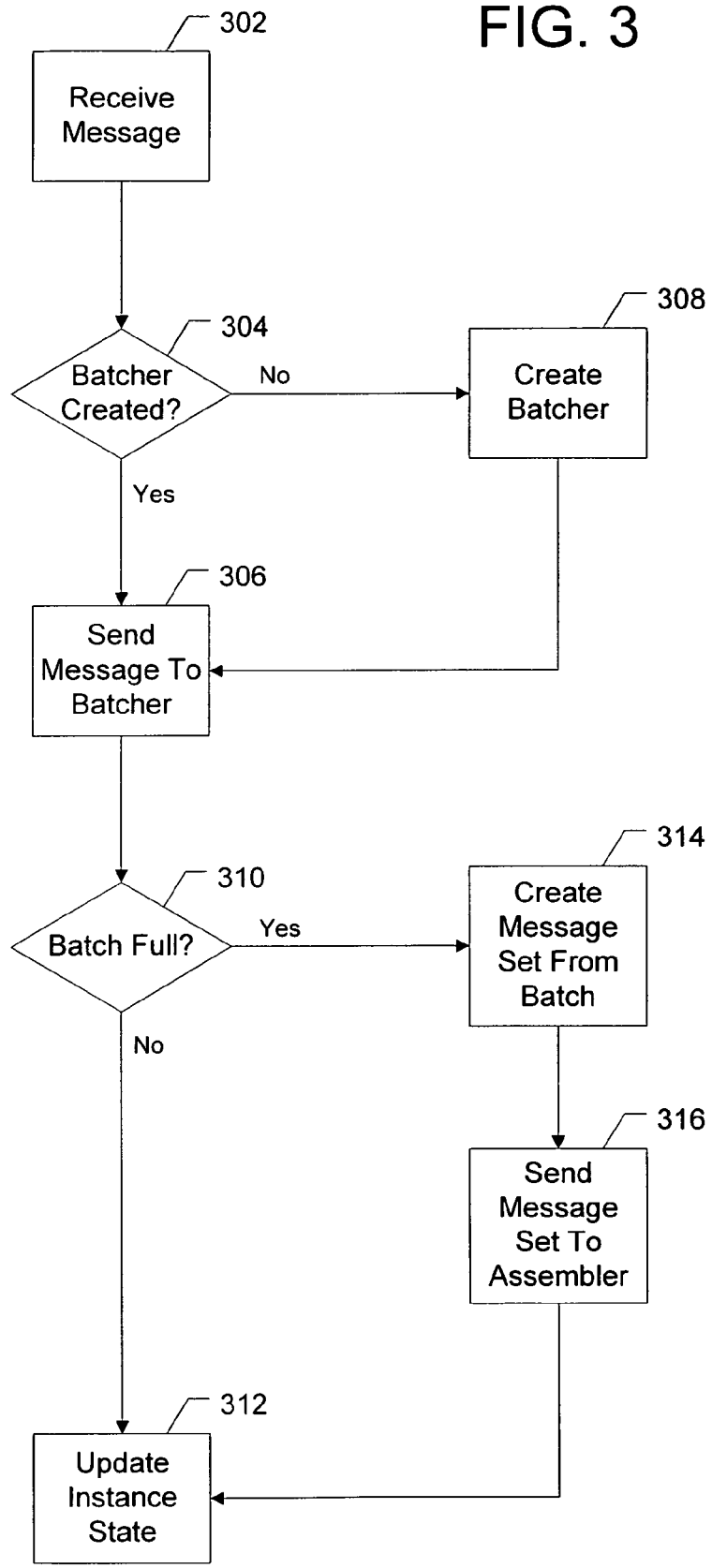
FIG. 3 is an exemplary flow diagram illustrating message aggregation according to an embodiment of the invention.

FIG. 3 is an exemplary flow diagram illustrating aspects of one embodiment of message aggregation. At 302, messaging engine 204 receives a message, addressed to a send port, from the source application 202. At 304, messaging engine 204 verifies that an instance of the batcher 206 associated with the send port exists. If so, the associated batcher 206 aggregates messages addressed to a common send port. On the other hand, if the batcher 206 associated with the send port does not exist, an instance of the batcher is created at 306.

In another embodiment, the message includes a batcher identifier associated with the particular batcher 206. In this embodiment, aspects of the invention perform a check to verify that an instance of the batcher 206 associated with the batch identifier exists. If the batcher 206 associated with batch identifier does not exist, an instance of the batcher is created at 306.

Referring further to FIG. 3, messaging engine 204 sends the message to the batcher 206 associated with the send port in the message address at 308. At 310, the batcher 206 determines if the batch of messages is complete. In one embodiment, the batcher 206 determines if the batch is complete as a function of a batch configuration policy, which contains the business logic used to make this determination. As described above, the business logic may include one or more of the following: number of messages in the batch, cumulative number of bytes in the batch, the type of messages in the batch, and a time period to accumulate messages. Advantageously, a customer can set its own criteria for batching messages by way of the batch configuration policy. Moreover, batcher 206 may sort the messages within the batch according to a desired sort order defined by the batch configuration policy.

If, at 310, the batcher 206 determines that the batch is not complete, the instance state 402 of the batch will be updated at 312. The instance state 402 includes a send port associated with the batcher 206 and a list of messages that have been addressed to the send port. The instance states 402 may be stored in data store 208. On the other hand, if the batcher 206 determines at 310 that the batch is complete, a message set is created from the batch at 314. At 316, the batcher 206 sends the message set to the assembler where messages are sent in a single output stream to a destination application 212. The destination application 212 may be, for example, a customer application, a supplier application, or a financial application. The output stream may be in EDI format, SWIFT format, GS1 System, HL7, or some other industry standard format as designated by the destination application 212. After the output stream has been sent, at 312 the instance state 402 of the batcher is updated.

In one embodiment, if new message for the batcher 206 is received at 302 while the messaging engine 204 is either creating a message set for the batcher at 314 or sending the message set to the assembler at 316, the messaging engine 204 will create a new instance of the batcher 206 at 308. The process will continue on at 306 for the new instance of the batcher 206. This allows the messaging engine 204 to handle concurrent batches where one batch is in the process of being sent to the assembler 210 while a new batch is begun on a new instance of the batcher 206.

For example, when the batcher 206 determines that a batch is complete, the messaging engine 204 takes note of it and passes the single output stream to the assembler 210. However, if in the mean time the messaging engine 204 receives a new message for that same send port, the messaging engine 204 will realize that the previous batch is complete and create a new batcher 206 and, hence, a new batch. The multiple inflight batchers 206 are identified by a 'batcherID'.

Figure 4:
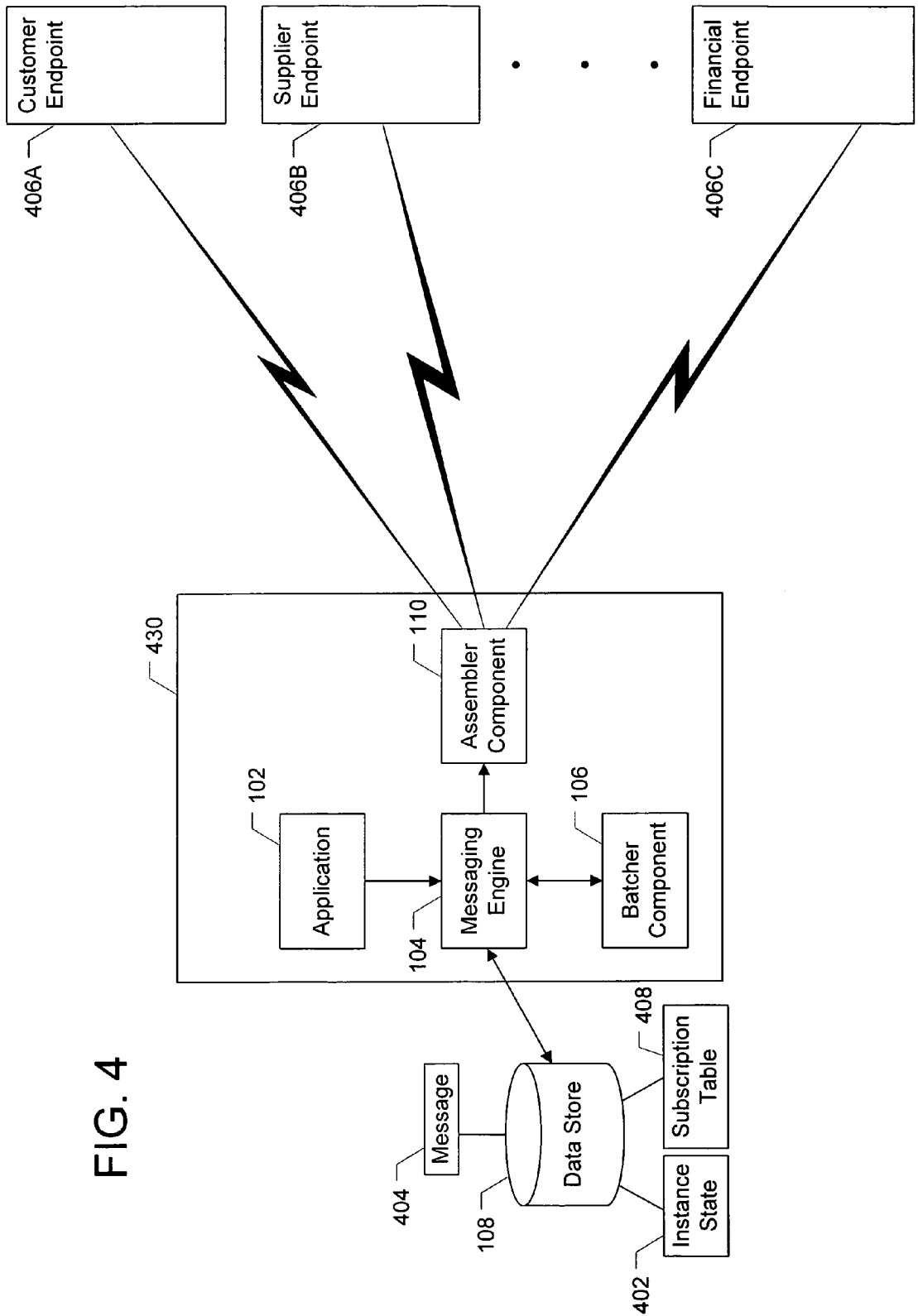
FIG. 4 is a block diagram illustrating one example of a suitable computing system environment in which the invention may be implemented.

FIG. 4 shows one example of a general purpose computing device in the form of a server 430. In one embodiment of the invention, a server such as the server 430 is suitable for use in the other figures illustrated and described herein. Server 430 has one or more processors or processing units and a system memory. In the illustrated embodiment, a system bus couples various system components including the system memory to the processors.

The server 430 typically has at least some form of computer readable media. Computer readable media, which include both volatile and nonvolatile media, removable and non-removable media, may be any available medium that may be accessed by server 430. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage such as the data store 108 or other magnetic storage devices, or any other medium that may be used to store the desired information and that may be accessed by server 430. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The server 430 may also include other removable/non-removable, volatile/nonvolatile computer storage media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like.

The drives or other mass storage devices and their associated computer storage media discussed above and illustrated in FIG. 4, provide storage of computer readable instructions, data structures, program modules 102, 104, 106, 110 and other data 402, 404 for the server 430.

The server 430 may operate in a networked environment using logical connections to one or more remote servers, such as remote servers 406A, 406B, 406C. The remote server may be a personal computer, a server, a router, a network PC, a peer device or other common network node, and typically includes many or all of the elements described above relative to server 430. The logical connections depicted in FIG. 4 include a local area network (LAN) and a wide area network (WAN), but may also include other networks. LAN and/or WAN may be a wired network, a wireless network, a combination thereof, and so on. Such networking environments are commonplace in offices, enterprise-wide computer networks, intranets, and global computer networks (e.g., the Internet).

When used in a local area networking environment, server 430 is connected to the LAN through a network interface or adapter. When used in a wide area networking environment, server 430 typically includes a modem or other means for establishing communications over the WAN, such as the Internet. The modem, which may be internal or external, is connected to system bus via the user input interface, or other appropriate mechanism. In a networked environment, program modules depicted relative to computer 130, or portions thereof, may be stored in a remote memory storage device (not shown). The network connections shown are exemplary and other means of establishing a communications link between the computers may be used.

Generally, the data processors of server 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including server 430, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, server 430 executes computer-executable instructions such as those illustrated in the figures to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above constructions, products, and methods without departing from the scope of aspects of the invention, it is intended that all matter contained in the above description and shown in the accompanying drawings shall be interpreted as illustrative and not in a limiting sense.

Appendix A

Outbound batching: A batcher component includes the logic that is used to cut the batch, i.e., decide when the batch is done. Also the batcher component encapsulates any other logic that is used to decide the order of messages in the batch, etc. A messaging engine component includes the code that is responsible for interacting with the batcher component, the pipeline and the database.

The batcher component may implement the following interfaces:

```
Interface IAggregator
{
// called to initialize the batcher/aggregator.
// the PropertyBag returned can be used to communicate
// various batcher(aggregator) configuration properties back to the
messaging engine.
PropertyBag Initialize( [in] Propertybag pb,  // used to pass send
// port info.
[in] ICallback pCallback );
Void AddMessage( IBaseMessage msg );
}
Interface ICallback
{
// following method is used by batcher to indicate when a batch is
// full..
Void BatchComplete( bool bBatchSuccesful,
IMessageSet msgSet );
```

-continued

```
// called by certain batcher's who first try to do in-memory batching
// however when they hit their configured data/memory thresholds
// they use this API to persist data to disk. It is also useful for perf.
Void PersistMessages ( IBaseMessageSet msgSet );
}

Interface IMessageSet
   {
   Property - IEnumerator MessageIDList;
   Property - IEnumerator MessageList;
   }
   // used at design time to bring up a property page from a schema
   Interface IConfiguration
   {
   String GetConfiguration( ) ; // returns configuration for the
   Aggregator(batcher)
   }
```

As shown in these interfaces, there may be two types of batchers: standard and high performance.

Standard batchers allow the messaging engine to handle all message persistence without the batcher's interaction. The type of the batcher is returned back to the messaging engine in a propertyBag in the call to Initialize( ). For standard batchers, the messaging engine will automatically persist the message to instance state after every call to AddMessage( ) till the batch is full.

High performance batchers are capable of pure in-memory batching and tell the messaging engine when to persist messages. For these batchers, the messaging engine will not persist the message to instance state after every call to AddMessage( ). Instead, the batcher is able to accumulate messages in memory. In this manner, when the batch is full, the batcher can call BatchComplete( ) on the messaging engine and give the IBaseMessageSet. The messaging engine is then able to directly execute the pipeline without having to read message from the instance state. These batchers may also have a configured threshold of holding messages in memory. Whenever the batcher would like to flush/persist the messages to disk, it can call PersistMessages( ) API to do the same. If the batcher has called PersistMessages( ) once, then it ensures that it persists all in-memory messages before it calls BatchComplete( ) with the MessageIDs.

The messaging engine Interaction:

When the messaging engine gets a message going to a batched send port, it checks to see if a batcher component has already been created for this sendport by looking at an internal hash table. If there is no batcher component already created, it creates a new one and call Initialize( ) on the batcher component.

The engine then calls AddMessage( ) on the batcher component for that message. The batcher component looks at the message and decides if the batch is full. If the batch is full, then it calls back the engine (ICallback) indicating a success batch status. If the batch is not full, then the batcher component returns back from AddMessage( ) after updating its internal state.

For standard batchers, when AddMessage returns and the batch is not full, the engine writes the message to the instance state. On the other hand, when the batch is complete, the batcher returns an IMessageSet back to messaging engine. The engine attempts to access the MessageIDList, which has the message IDs of the messages in the right order (any kind of sorting is done by the batcher on this list). Given the MessageIDList, The engine may start pulling messages out of the instance state in the right order. The engine creates a message set out of these documents and then gives this message set to the pipeline manager to execute the pipeline.

High performance batchers, in contrast to standard batchers, periodically call PersistMessages( ) on the ICallback to flush messages to instance state. If more messages arrive for this batch, the engine calls AddMessage( ) on the batcher component that was created earlier. The callback (ICallback) may be called synchronously from AddMessage( ) or may be called asynchronously by the batcher component. If the batch has to be cut based on time, then the batcher component waits for a windows timer for the batch, i.e., if the time out occurs then it calls back the engine and tells it that the batch is complete. When the batch is complete, the batcher returns an IMessageset back to the engine. The engine first attempts to access the MessageIDList (same as for standard batchers). If the MessageIDList is empty, the engine attempts to read the MessageList. This has a valid value if the batcher is doing in-memory batching. If the MessageList is present, the engine will create an IBaseMessaegSet and will execute the pipeline.

Pipeline Execution: An interface in the pipeline manager permits the engine to give a message set to the pipeline for execution. The pipeline manager then calls AddDocument on the assembler for all the messages in the message set and then assembles the messages.

Independent Message batching:

The messaging engine creates a dummy Instance when the 1 st message for a send port (configured for independent batching) is received from agent. The engine maintains a hash table that maps SendPortID to batcher pipeline pointer. At any point of time there is one active batcher component in which any new messages going to the send port will be fed to only the active batcher component. Other batcher components may be inactive in, for example, a failover scenario.

Dependent Message Batching:

For dependent message batching, the following are configured on a send port. Send port has the option whereby users can select the property that will be used for forming dependent batches. For example, if the selected message context property is BTS.BatchID, then a convoy subscription is created for the send port. Each message has at least two special message context properties: (a) Property used for the convoy (BTS.BatchID); (b) BTS.BatchEnd=true/false—used by the batcher; (c) BTS.BatchStart=true/false—also used by batcher. Properties (b) and (c) are configured in the Batcher property pages and do not appear in the send port properties.

The producer of the messages (A workflow schedule or a pipeline service) promotes BTS.BatchID for every message that it is publishing for this send port. Messages having the same BTS.BatchID are sent to the same instance of the send port for batching. The producer of the messages knows when the batch is complete and will be writing the BTS.BatchEnd.

To start a new batch, the publisher of the messages promotes BTS.BatchID (which is unique) and publishes the message. A new instance is created by the message box after checking the convoy table.

Subsequent messages having the same BTS.BatchID are delivered on the same instance by the msgbox. When these messages are delivered to the messaging engine, it already knows that they are dependent message batches (sendport configuration). The engine hashes BTS.BatchID to the correct batcher pointer.

The batcher may perform the following for dependent batches: (a) Batcher looks at the BTS.BatchEnd property and determines when to cut the batch; (b) Batcher handles failure cases, e.g., if the user wants to have a time out; (c) Batcher sorts messages.

The engine may write messages to the instance state of the current instance depending on if it is standard batcher or a high performance batcher as described above.

If the batch is complete, the engine executes the assembler and sends the message out. When the assembled message is successfully sent out (deleteMessage( )), the framework instanceCompletes the instance that was created due to the convoy. All the other issues retries/movetonextTransport/ catastrophic failure, etc. are similar to independent message batching.

Reading and Writing to/from Instance State:

When a message is written to the instance state, the framework first writes the messageID to the instance stream. Then it calls agent API AddMessageObject( ).

Also, when writing a message to the instance state, the framework receivecomplete( ) the original message in the same transaction to delete the original message from the ApplicationQ.

To read messages out of the instance state, the framework uses the messageIDs. In other words, the framework reads the instance stream first to get the messageIDs and then uses them to get the messages. Pulling messages out by message ID, maintains order as well.

Instance Fail Over:

If the process dies due to some catastrophic failure, then the message box creates a dummy message the next time around when the process comes back up. The messaging engine receives this dummy message and can identify that this message corresponds to the sendport that is being batched. That is, before writing to the instance state for the first message for the instance, the messaging engine writes the destination SendPortID and other relevant information to the instance state stream.

If the send port is configured for an independent message batch, then when an instance fails over, it may be given back to a messaging engine instance that already has an active batcher in use. Hence, when the keep alive/dummy message is received by the messaging engine, the messaging engine drains the whole batch stored in the instance state in the same thread. The messaging engine creates a new batcher object and initializes it. The property bag passed by the messaging engine to the batcher indicates that this is a failed over instance. Also, if possible, the messaging engine also provides the number of messages in the batch. The messaging engine then reads all the messages out of the instance state and calls AddMessage( ) on the batcher. When the batcher receives the last message, it calls BatchComplete( ) on the messaging engine.

Depending on how the batcher is configured, it can either pass or fail the batch. If the batch is failed, then the messaging engine suspends all the messages in the batch.

Send Transport Functions:

Successful transmission: The adapter calls DeleteMessage( ) on the message that came out of the pipeline. The messages from the Q have already been received completed( ) so messages in the InstanceState are deleted. To delete a message from an instance state, the framework calls agent API ReleaseMessage( ).

Resubmits: The messages from the Q have already been received completed( ) so the framework retries the messages that are in the InstanceState. A timer message that comes back after the retry interval is posted. When the messaging engine sees the timer message, reading messages out of the instance state restarts and processing resumes. Again, the messageIDs are read from the instance stream in order and then the messages are pulled from the instance state.

MoveToNextTransport: The messaging engine posts a message to the instance. When this message comes back up, the messaging engine knows that the message is getting moved to the backup transport and it attempts to drain the messages from the instance state and process the batch.

SuspendMessage: The messages inside the InstanceState pulled out of the instance state and suspended using the SuspendMessages(MessageId[]) API, which moves these message from the instance state to the suspendQ. Alternatively a message may be posted to the dummy instance and the dummy instance suspended. When the message is resumed, the instance state is drained.

The batched send port is also marked for ordered delivery: When this happens, the messaging engine does not create a dummy instance for the send port even for the case of independent batches. The messaging engine automatically uses the instance state corresponding to the default instance for the ordered send port. The behavior may marginally change in the fact that before giving up the agent delivery thread, the messaging engine blocks for the adapter to acknowledge that the message was sent or failed (the callbacks on the batch).

Tracking: A link may be maintained between the input messages to the send pipeline and the output message. When a message is moved from the applicationQ to the instance state, calling ReceiveComplete( ) on the message deletes the message from the applicationQ. The status in HAT when this happens is distinguishable from the status shown when the message is fully processed (i.e., DeleteMessage( )—translates to ReceiveComplete( )).

What is claimed is:

1. A computerized method of aggregating messages at a batching computer, said batching computer receiving messages for at least one destination application via a communications network, said method comprising:

storing message subscriptions in a data store, said message subscriptions defining a list of batching services at the batching computer that receive messages satisfying a particular condition;

receiving a plurality of messages at the batching computer from at least one source application via the communications network;

evaluating each of the received plurality of messages against the message subscriptions to identify which batching service at the batching computer will receive each message satisfying the particular condition;

stamping each of the received plurality of messages with a service identifier corresponding to the batching service identified during the evaluating;

defining a batch configuration policy at the batching computer, said batch configuration policy including criteria for aggregating the messages received from the at least one source application at the batching computer into a batch for the at least one destination application and business logic for determining when the batch is complete;

aggregating the received messages into a batch at the batching computer as a function of the batch configuration policy applied to the received messages and as a function of the service identifier stamped on each of the received messages, said service identifier identifying the batching service to aggregate the received messages;

maintaining an instance state associated with the batch, said instance state permitting the recovery of the batch in the event that a failure of the batcher computer is determined;

in response to determining a failure of the batching computer, recovering the batch at the batching computer based on the instance state; and in response to determining that the batch is complete, serializing the received messages in the batch into a single message output stream.

2. The method of claim 1, wherein the single message output stream is addressed to an endpoint.

3. The method of claim 1, further comprising storing the instance state in a data store.

4. The method of claim 3, wherein the receiving, aggregating, and maintaining are associated with a first computer and the data store is associated with a second computer.

5. The method of claim 1, wherein the receiving further comprises storing the received messages in a data store.

6. The method of claim 1, wherein the business logic includes at least one of the following policy parameters: a sort order of the messages in the batch, a number of messages in the batch, a cumulative number of bytes in the batch, one or more types of messages in the batch, and a time period to accumulate messages.

7. The method of claim 1, wherein the aggregating further comprises sorting the messages as function of the batch configuration policy.

8. The method of claim 1, wherein the messages comply with an EDI (Electronic Data Interchange) standard.

9. One or more computer-readable media having computer-executable instructions stored thereon for performing the method of claim 1.

10. A computerized method of aggregating messages at a batching computer for sending to at least one destination application, said batching computer receiving messages from at least one source application via a communications network, said method comprising:
   storing message subscriptions in a data store, said message subscriptions defining a list of batching services that receive messages satisfying a particular condition;
   receiving a plurality of messages at the batching computer from the at least one source application via the communications network, said messages including a batch identifier and a batch end indicator;
   evaluating each of the received plurality of messages against the message subscriptions to identify which batching service will receive each message satisfying the particular condition;
   aggregating the messages received from the at least one source application into a batch associated with the batch identifier at the batching computer as a function of the batch identifier and as a function of the evaluating;
   maintaining an instance state associated with the batch, said instance state permitting the recovery of the batch in the event that a failure of the batcher computer is determined;
   in response to determining a failure of the batching computer, recovering the batch at the batching computer based on the instance state;
   completing the aggregating as a function of the batch end indicator;
   in response to completing the aggregating, serializing the received messages in the batch into a single message output stream; and
   in response to serializing the batch into the single message output stream, sending the single message output stream from the batching computer to the at least one destination application.

11. The method of claim 10, further comprising hashing the batch identifier to determine the instance of a batcher for aggregating the messages.

12. The method of claim 10, wherein the batch end indicator signals when the batch is complete.

13. The method of claim 10, wherein the single message output stream is addressed to an endpoint.

14. The method of claim 10, further comprising storing the instance state in a data store.

15. One or more computer-readable media having computer-executable instructions stored thereon for performing the method of claim 10.

16. A system for aggregating messages for at least one destination application, said messages being addressed by at least one source application to a send port on a communications network, said system comprising a computer-readable storage media having one or more computer-executable components stored thereon and a batching computer having a processor for executing said computer-executable components, said one or more computer-executable components comprising:
   a message engine component for:
      storing message subscriptions in a data store, said message subscriptions defining a list of batching services that receive messages satisfying a particular condition;
      receiving messages at the batching computer via the send port on the communications network from the at least one source application;
      evaluating each of the received plurality of messages against the message subscriptions to identify which service will receive each message satisfying the particular condition; and
      stamping each of the received plurality of messages with a service identifier corresponding to the service identified during the evaluating;
   a batcher component for:
      aggregating messages into a batch at the batching computer as a function of a batch configuration policy and as a function of the service identifier stamped on each of the received messages, said batcher component receiving at the batching computer the messages from the message engine, said messages being addressed to the send port, said batch configuration policy including criteria for aggregating the messages received from the at least one source application at the batching computer into a batch for the at least one destination application and including business logic for determining when the batch is complete;
      maintaining an instance state associated with the batch, said instance state permitting the recovery of the batch in the event that a failure of the batcher computer is determined; and
      in response to determining a failure of the batching computer; recovering the batch at the batching computer based on the instance state;
   wherein the message engine component dynamically creates a new instance of the batcher component associated with the send port as needed if an instance of the batcher component associated with the send port does not exist when messages are received from the at least one source application via the send port.

17. The system of claim 16, wherein the message engine component is associated with a first computer and maintains the instance state of the batch stored in a data store associated with a second computer, said instance state including a message identifier and send port identifier; and
   wherein the message engine component stores the messages in said data store associated with said second computer.

* * * * *